US008472141B2

(12) United States Patent  (10) Patent No.: US 8,472,141 B2
Gao et al.  (45) Date of Patent: Jun. 25, 2013

(54) SHIELD WITH DOWN-TRACK THROAT REGION

(75) Inventors: Kaizhong Gao, Shoreview, MN (US); Mourad Benakli, Bloomington, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/612,449

(22) Filed: Sep. 12, 2012

(65) Prior Publication Data

US 2013/0004795 A1 Jan. 3, 2013

Related U.S. Application Data

(63) Continuation of application No. 12/915,267, filed on Oct. 29, 2010, now Pat. No. 8,345,385.

(51) Int. Cl.
 *G11B 5/39* (2006.01)
(52) U.S. Cl.
 USPC ........................................................ 360/125.3
(58) Field of Classification Search
 USPC ........................................................ 360/125.3
 See application file for complete search history.

(56) References Cited

U.S. PATENT DOCUMENTS

| 6,771,462 | B1 | 8/2004 | Khizroev et al. |
| 6,898,053 | B1 | 5/2005 | Khizroev et al. |
| 7,804,662 | B2 * | 9/2010 | Chen et al. ............... 360/125.12 |
| 7,979,978 | B2 * | 7/2011 | Han et al. .................... 29/603.15 |
| 7,995,307 | B2 * | 8/2011 | Zheng ....................... 360/125.13 |
| 8,000,059 | B2 * | 8/2011 | Jiang et al. ................. 360/125.3 |
| 8,051,552 | B2 * | 11/2011 | Jiang et al. ................. 29/603.16 |
| 8,094,419 | B2 * | 1/2012 | Guan ........................... 360/319 |
| 8,120,874 | B2 * | 2/2012 | Hsiao et al. .............. 360/119.04 |
| 2005/0029565 | A1 | 2/2005 | Mattson |
| 2007/0258167 | A1 * | 11/2007 | Allen et al. .................. 360/126 |
| 2007/0285835 | A1 | 12/2007 | Sun et al. |
| 2008/0100959 | A1 | 5/2008 | Feldbaum et al. |
| 2010/0163422 | A1 | 7/2010 | Hsiao et al. |

* cited by examiner

*Primary Examiner* — Mark Blouin

(74) *Attorney, Agent, or Firm* — Hall Estill Attorneys at Law

(57) ABSTRACT

A write element for magnetic recording includes a main pole and a shield. The main pole has first and second sides with respect to a down-track direction. The shield at least partially surrounds the main pole with a continuously concave inner sidewall. The angle between the inner sidewall of the shield and the direction of motion of the write element is greater than the angle between the sides of the main pole and the direction of motion.

20 Claims, 7 Drawing Sheets

SHIELD WITH DOWN-TRACK THROAT REGION

RELATED APPLICATION

This application is a continuation of copending U.S. patent application Ser. No. 12/915,267 filed Oct. 29, 2010.

SUMMARY

A shield with inner walls surrounds a main pole. The inner walls of the shield have wall angles with respect to a down track direction that exceed the wall angles of the main pole with respect to a down track direction. One embodiment of the shield resembles a wine glass shaped cavity.

DETAILED DESCRIPTION

Figure 1:
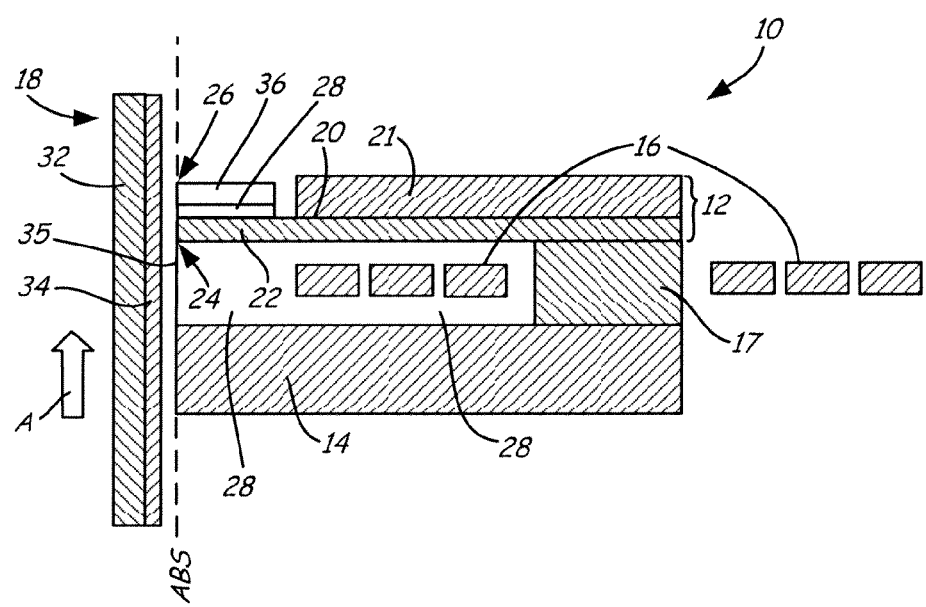
FIG. 1 is a cross sectional view of a perpendicular magnetic recording head according to an embodiment.

FIG. 1 is a cross sectional view of an example perpendicular writer 10 in accordance with various embodiments, which includes main pole 12, return pole 14, and write coils 16. Conductive write coils 16 surround back gap closure 17 that magnetically couples main pole 12 to return pole 14. Perpendicular writer 10 confronts magnetic medium 18 at an air bearing surface (ABS) of main pole 12 and return pole 14. Main pole 12 includes main pole body 20, yoke 21, and main pole tip 22. Yoke 21 is coupled to an upper surface of main pole body 20. Main pole tip 22 has a leading edge 24 and a trailing edge 26. Main pole tip 22 is separated from return pole 14 at the ABS by insulating material 28. Write gap 35 is defined by the distance between leading edge 24 and return pole 14.

Magnetic medium 18 may include magnetically soft underlayer 32 and magnetically hard recording layer 34. It should be noted that the configuration for perpendicular writer 10 is merely illustrative and many other configurations may alternately be employed in accordance with the present invention. For example, perpendicular writer 10 may include trailing shields, side shields, or wrap around shields that absorb stray magnetic fields from main pole tip 22, magnetic side tracks on recording layer 34, and other sources, such as the trailing edge of return pole 14, during recording. Trailing shield 36 is shown proximate insulating layer 28 that surrounds main pole tip 22 of perpendicular writer 10.

Magnetic medium 18 travels or rotates in a direction relative to perpendicular writer 10 as indicated by arrow A. To write data to magnetic medium 18, an electric current is caused to flow through conductive write coils 16, which passes through write gap 35, between main pole 12 and return pole 14. This induces a magnetic field across write gap 35. By reversing the direction of the current through conductive coils 16, the polarity of the data written to magnetic medium 18 is reversed. Main pole 12 operates as the trailing pole and is used to physically write the data to magnetic medium 18. Accordingly, it is main pole 12 that defines the track width of the written data. More specifically, the track width is defined by the width of trailing edge 26 of main pole tip 22 at the ABS. Main pole 12 may be constructed of a material having a high saturation moment such as NiFe or CoFe or alloys thereof. More specifically, in various embodiments the main pole 12 is constructed as a lamination of layers of magnetic material separated by thin layers of nonmagnetic insulating material 28 such as, for example, aluminum oxide.

Figure 2:
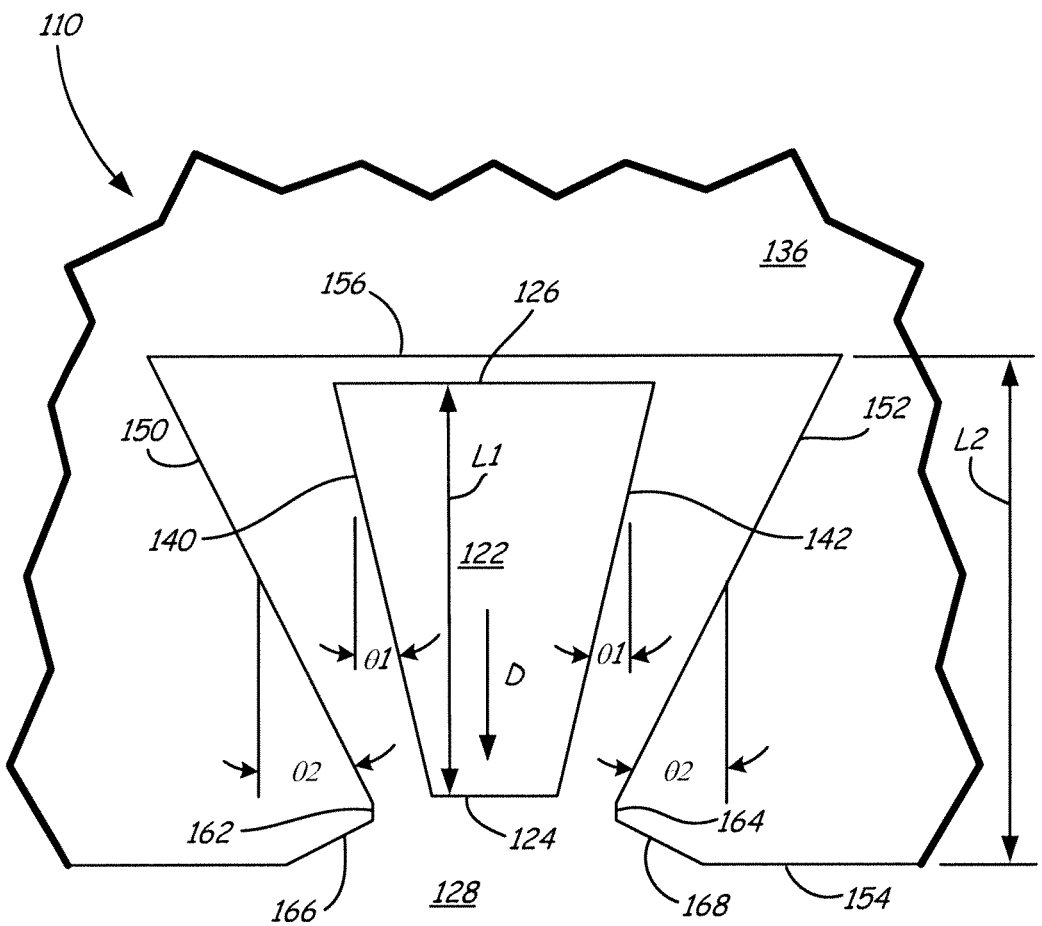
FIG. 2 is an air bearing surface view of a writer pole and "wine glass" shaped trailing shield according to an embodiment.
Figure 2:
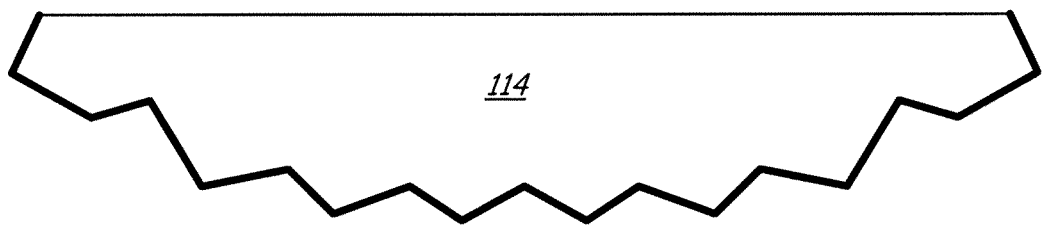

One embodiment is shown in FIG. 2, which is a schematic representation of an ABS view of perpendicular writer 110. As shown in FIG. 2, writer 110 includes return pole 114, main pole 122, insulator 128, and trailing shield 136. Main pole 122 has a trapezoidal pole tip with leading edge 124, trailing edge 126 and sides 140 and 142. In this embodiment, shield 136 includes inner sidewalls 150 and 152, leading edge 154, trailing edge 156, throat sidewalls 162 and 164, and mouth sidewalls 166 and 168. Leading edge 154 preferably is located closer to return pole 114 than is leading edge 124 of main pole 122, wherein any stray field may be effectively prevented from reaching the magnetic medium. Inner sidewalls 150 and 152 of shield 136 may not be parallel to sides 140 and 142 of main pole 122. As one possible result, wall angles $\theta 2$ of shield 136 may be larger than wall angles $\theta 1$ of main pole 122. The trapezoidal shape is narrower at leading edge 124 than at trailing edge 126 to aid in preventing skew related adjacent track interference during writing while the write head is located at inner and outer portions of a magnetic disc.

In writer 110, throat sidewalls 162 and 164 and mouth sidewalls 166 and 168 are adjacent leading edge 154, thereby possibly minimizing magnetic field concentration in that vicinity during writing. The significance of increasing the wall angle and introducing throat sidewalls 162 and 164 is that, as the size of main pole 122 decreases in response to a demand for higher areal density recording, the effective writing field of magnetic writer 110 may significantly exceed the effective writing field of a writer with a main pole having identical dimensions with shield walls parallel to main pole walls 142. The shape of the cavity in shield 136 surrounding main pole 122 in writer 110 resembles a wine glass. The length of main pole 122, L1, may be less than the length of shield cavity L2 and spacing S1 toward the front of the cavity may be less than spacing S2 at the back of the cavity.

To assess how shield shape impacts writing performance, a series of calculations were made of the performance of a writer having a trapezoidal shaped cavity with walls parallel to walls 140 and 142 and writer 110 with a wine glass shaped cavity for a shield. Measured variables were main pole write width, write pole wall angles $\theta 1$, side shield spacing, and side shield wall angles $\theta 2$. In the trapezoidal shaped cavities, $\theta 1 = \theta 2$. The dimensions of main poles were the same in both writer configurations.

Figure 3:
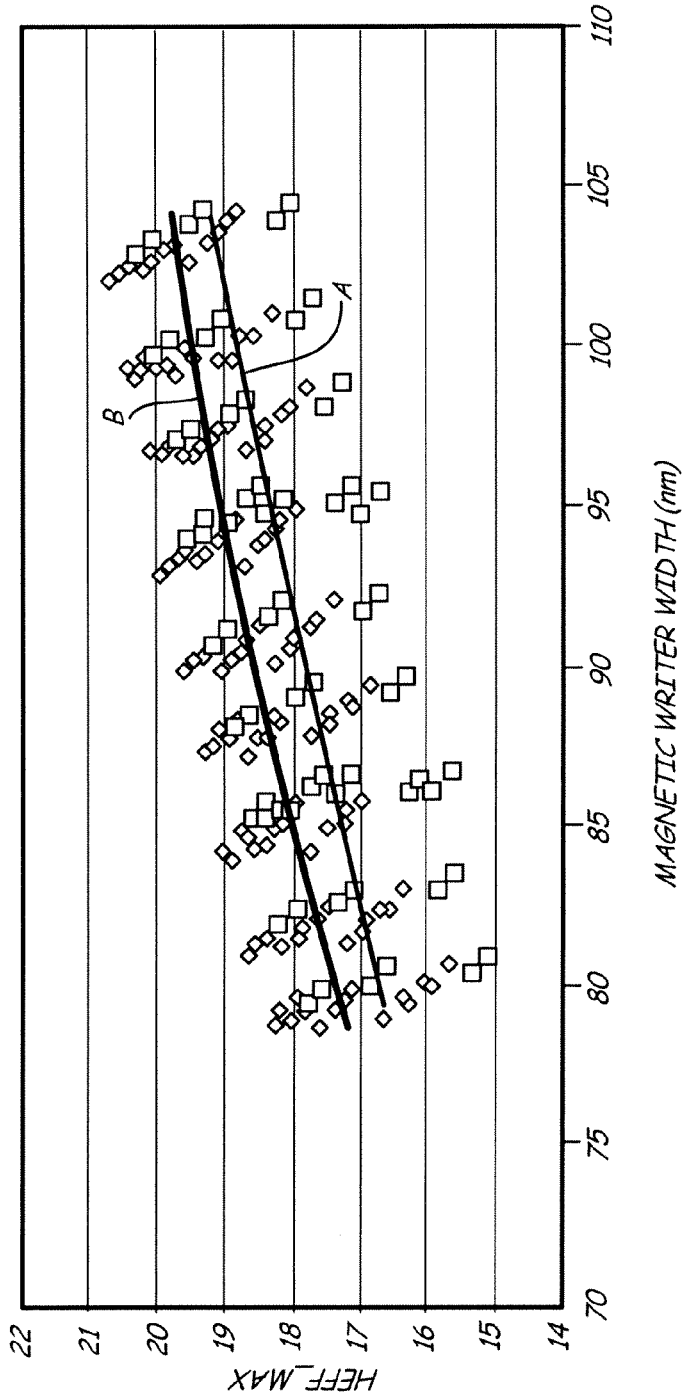
FIG. 3 is a plot of effective magnetic write field as a function of magnetic write width for a writer pole trailing shield with trapezoidal-shaped cavity and for the writer pole wine glass trailing shield cavity of FIG. 2.

Exemplary results of such calculations are shown in FIG. 3. In FIG. 3, the maximum effective write field $H_{eff}(max)$ is plotted versus the magnetic writer width. The data represent a series of $H_{eff}(max)$ for both writer configurations with identical write current, main pole wall angle, and main pole writer width. The average results for a trapezoidal shaped cavity magnetic writer design with θ1 =θ2 are given by curve A. The average results for wine glass writer design 110 are given by curve B. For each case studied in the simulation, the wine glass design gave both consistently higher effective writing fields at a given magnetic write width and narrower magnetic write widths at the same write field.

Figure 4:
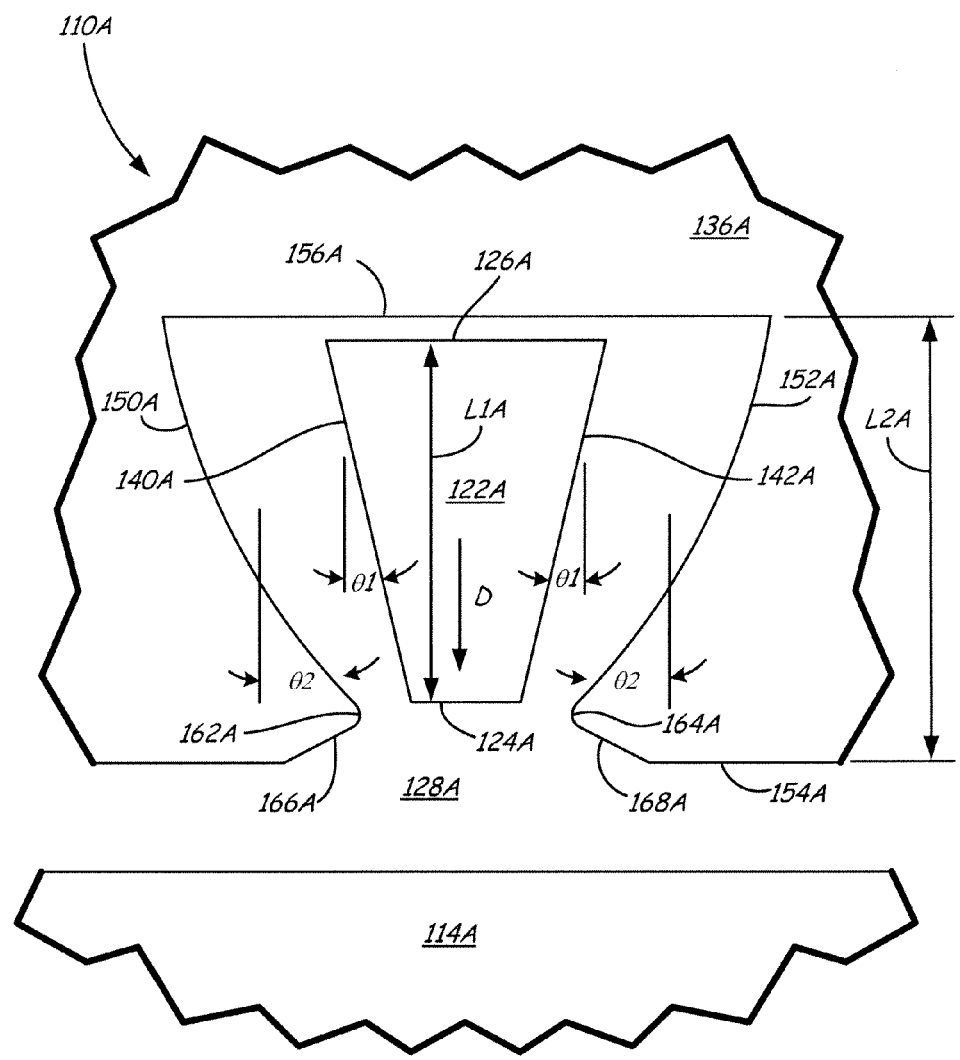
FIG. 4 is an air bearing surface view of a writer pole and wine glass trailing shield cavity according to an embodiment.

FIG. 4 shows a schematic representation of an ABS view of an example perpendicular writer 110A, which also features a shield with a wine glass shaped cavity. In FIG. 4, elements of writer 110A that are similar to elements of writer 110 are designated with the same reference number followed by the letter "A". Thus, main pole 122A of writer 110A is similar to main pole 122 of writer 110. In this embodiment, inner sidewalls 150A and 152A, throat sidewalls 162A and 164A, and mouth sidewalls 166A and 168A of shield 136A are concave, further minimizing magnetic field concentrations in the vicinity of the throat area defined by sidewalls 162A and 164A. Wall angles θ2 of sidewalls 150A and 152A may be larger than wall angles θ1 of main pole 122A. Length L1A of pole 122A may be less than length L2A of the shield cavity and spacing S1A toward the front of the cavity may be less than spacing S2 at the back of the cavity. This design may result in greater effective magnetic fields during writing due to the narrower magnetic footprint of pole 122A at the ABS.

Figure 5:
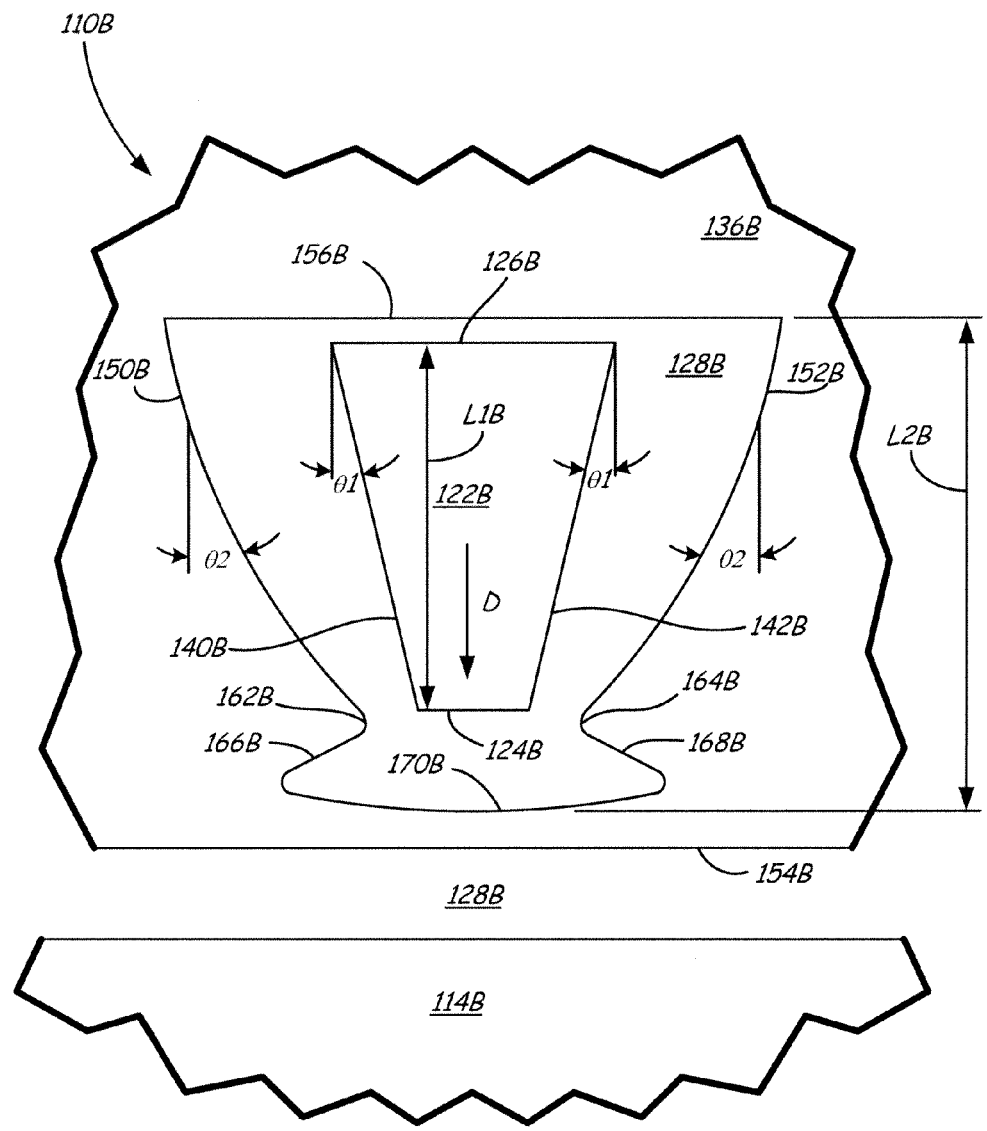
FIG. 5 is an air bearing surface view of a writer pole with wine glass trailing shield cavity according to an embodiment.

FIG. 5 is a schematic representation of an ABS view of perpendicular writer 110B illustrating another embodiment of the invention featuring a shield with a wineglass shaped cavity. Perpendicular writer 110B is similar to writers 110 and 110A, and similar elements are designated with the same reference number followed by the letter "B". In this embodiment, shield 136B completely surrounds writer pole 122B. In FIG. 5, the cavity does not extend to leading edge 154B of shield 136B. Leading end wall 170B of the cavity is positioned near, but spaced from shield leading edge 154B. Curved sidewalls 150B and 152B, throat sidewalls 162B and 164B, mouth sidewalls 166B and 168B and cavity leading end wall 170B resemble a wine glass. Length L1B of pole 122C may be less than length L2B of the shield cavity and spacing S1B toward the front of the cavity may be less than spacing S2B at the back of the cavity.

Figure 6:
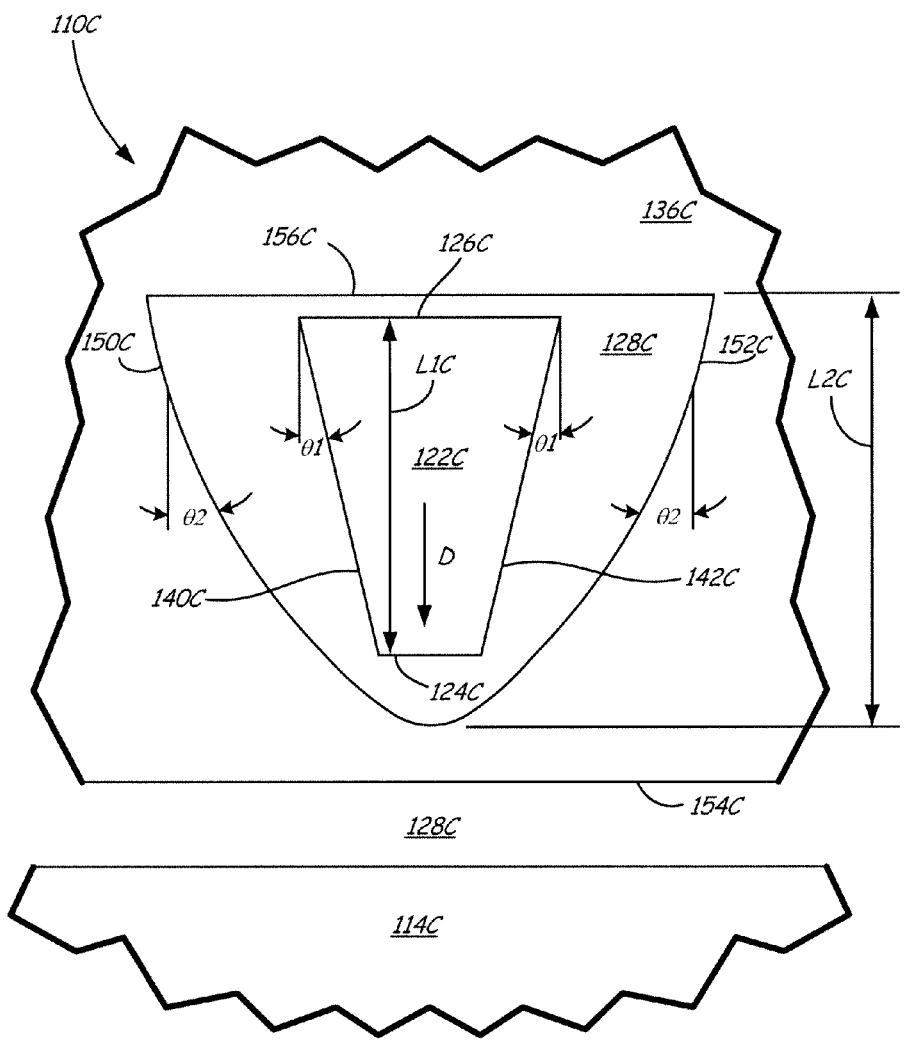
FIG. 6 is an air bearing surface view of a writer pole with trailing shield cavity with greater wall angles according to an embodiment.

FIG. 6 is a schematic representation of an ABS view of perpendicular writer 110C illustrating another embodiment of the invention. Writer 110C is similar to writers 110, 110A, and 110B, and similar elements are designated with the same reference number followed by the letter "C". In this embodiment, trailing shield 110C completely surrounds main pole 122C and the cavity does not extend to leading edge 154C of shield 110C. Sidewalls 150C and 152C form wall angles θ2 that are larger than wall angles θ1 of main pole 122C. The cavity resembles a wine glass without a stem. That is, the cavity resembles the bowl of a wine glass. Length L1C of pole 122C may be less than length L2C of the shield cavity and spacing SiC toward the front of the cavity may be less than length S2C at the back of the cavity.

Differences in the shape and dimensions of the trailing shield with respect to the main pole dimensions are key parameters in defining the magnetic bit shape on the recording medium. The wine glass writer design may allow the magnetic write width to be varied by the shield geometry as well as by the main pole geometry. As shown in FIG. 3, the magnetic writer width of any effective write field can be decreased by the inventive shield geometries disclosed herein. As a result, referring to FIG. 2, for instance, leading edge 124, trailing edge 126 and wall angles θ1 can be made smaller while pole 122 produces the same write field. Another benefit is that trapezoidal main poles with smaller wall angles are easier to fabricate, thereby decreasing the manufacturing costs.

Figure 7:
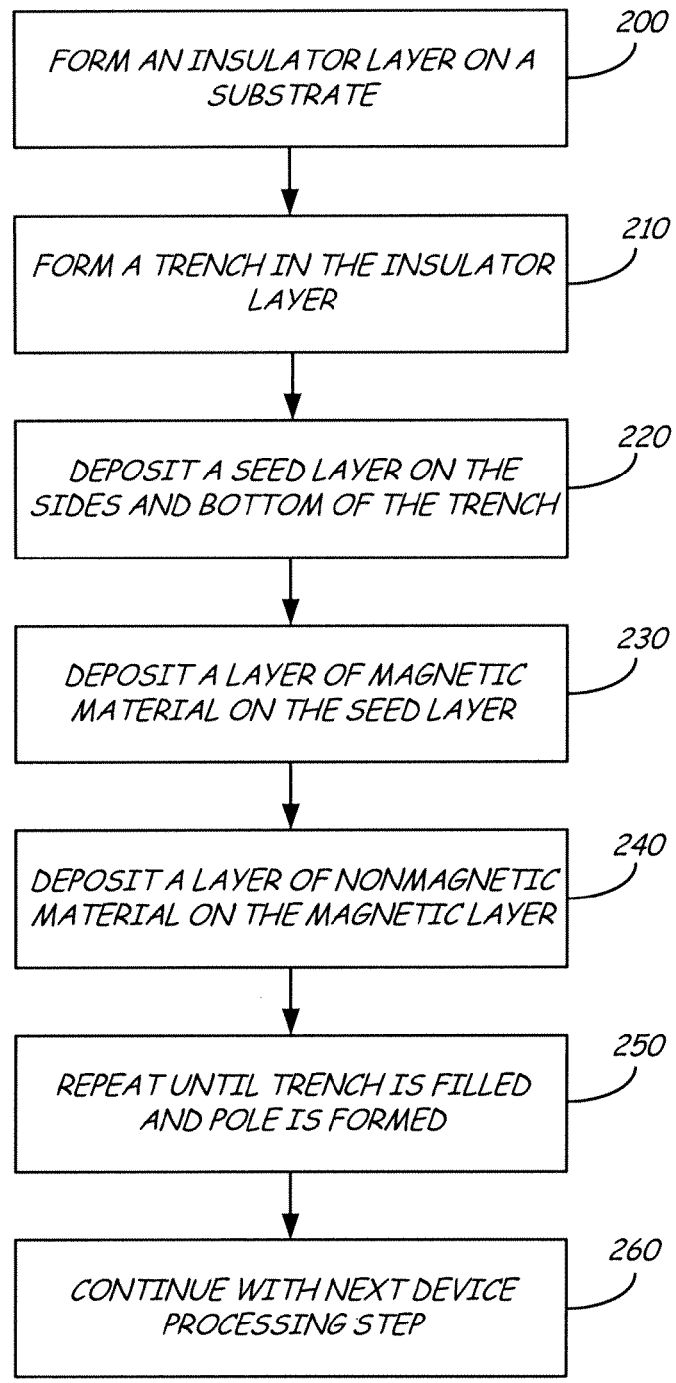
FIG. 7 provides a flowchart of an example magnetic element fabrication routine carried out in accordance with various embodiments.

Write pole fabrication by damascene processing is a fabrication method. Pole fabrication by damascene processing is described in commonly owned U.S. Pat. No. 6,949,833 and patent application Ser. No. 12/491,898 and incorporated herein in their entirety by reference. FIG. 7 illustrates exemplary steps to form a pole in an insulator layer such as layer 128 in FIG. 2. First, an insulator layer is formed on a substrate (Step 200). The insulator layer is preferably aluminum oxide although other insulator materials known in the art such as SiOx, MgO, SiC, etc. may be used.

Next, a trench is formed in the insulator layer (Step 210). The cross section of the trench is preferably trapezoidal as shown by pole 122 in FIG. 2. A seedlayer is then deposited on the walls and bottom of the trench to assist in formation of pole 122 (Step 220). A seedlayer is necessary to control the quality of subsequent layers deposited in the trench and can be deposited by plating, sputtering, or other material deposition techniques. An electrically conducting seedlayer is necessary if subsequent layers are to be deposited by electroplating.

A layer of magnetic material is then deposited on the seedlayer (Step 230). As discussed earlier, NiFe, CoFe, or alloys thereof are preferred. The magnetic layer can be deposited by electroplating, sputtering, or other methods of material deposition. Laminated pole structures provide improved write performance. The next step is to deposit a layer of nonmagnetic material on the magnetic material (Step 240). Nonmagnetic materials suitable for use as a spacer layer are tantalum, ruthenium, aluminum oxide, magnesium oxide, and others. In the next step, the process is repeated until the trench is filled and the pole is formed (Step 250). The process then proceeds to the next manufacturing cycle (Step 260).

Although the present invention has been described with reference to preferred embodiments, workers skilled in the art will recognize that changes may be made in form and detail without departing from the spirit and scope of the invention.

What is claimed:

1. An apparatus comprising:
a main pole having first and second sidewalls connecting leading and trailing edges; and
a shield positioned adjacent to and separated from the main pole, the shield configured to continuously extend from the trailing edge to beyond the leading edge to provide a narrowed throat region down-track from the leading edge of the main pole.

2. The apparatus of claim 1, wherein the shield has a shield sidewall separated from the main pole by a non-uniform gap.

3. The apparatus of claim 2, wherein the shield sidewall is closer to the main pole proximal the leading edge than proximal the trailing edge.

4. The apparatus of claim 1, wherein the throat region has a throat sidewall oriented with a throat angle that differs from a shield angle of a shield sidewall.

5. The apparatus of claim 4, wherein the throat region comprises a mouth sidewall extending down-track from the throat sidewall.

6. The apparatus of claim 5, wherein the mouth sidewall has a mouth angle that differs from both the throat and shield angles.

7. The apparatus of claim 5, wherein the mouth sidewall extends away from the main pole.

8. The apparatus of claim 1, wherein the first sidewall is linear and a shield sidewall is continuously curvilinear.

9. The apparatus of claim 1, wherein the first and second sidewalls of the shield are separated from the leading edge by a first distance that is greater than a second distance between throat sidewalls of the throat region.

10. A magnetic element comprising:
a main pole having first and second pole sidewalls connecting leading and trailing edges; and
a shield positioned adjacent to and separated from the main pole, the shield configured to continuously extend from the trailing edge to beyond the leading edge to provide a narrowed throat region down-track from the leading edge of the main pole, the throat region separated by a distance less than a first width of the trailing edge of the write pole.

11. The magnetic element of claim 10, wherein the throat region is defined by throat sidewalls positioned on opposite sides of the main pole.

12. The magnetic element of claim 10, wherein the first width is greater than a second width of the leading edge.

13. The magnetic element of claim 10, wherein the throat region defines a first distance between first and second shield sidewalls that is less than any other distance between the first and second shield sidewalls.

14. The magnetic element of claim 13, wherein the throat region is the closest point from the first and second shield sidewalls first to the main pole.

15. The magnetic element of claim 13, wherein the shield continuously extends from a first side of the main pole to an opposite second side of the main pole.

16. The magnetic element of claim 13, wherein the first shield sidewall has a shield angle greater than a wall angle of the first pole sidewall.

17. The magnetic element of claim 10, wherein the throat region is continuously curvilinear.

18. A write head comprising:
a main pole having first and second sidewalls connecting leading and trailing edges; and
a shield positioned adjacent to and separated from the main pole, the shield configured to continuously extend from the trailing edge to beyond the leading edge to provide a narrowed throat region down-track from the leading edge of the main pole, the shield configured to continuously surround the main pole.

19. The write head of claim 18, wherein the throat region defines a cleavage between the write pole and a down-track cavity.

20. The write head of claim 19, wherein the down-track cavity is enclosed by mouth sidewalls and a leading end wall.

* * * * *